(12) United States Patent
Wirtz

(10) Patent No.: US 6,356,650 B1
(45) Date of Patent: Mar. 12, 2002

(54) METHOD FOR COMPUTER-ADAPTATION OF A REFERENCE DATA SET ON THE BASIS OF AT LEAST ONE INPUT DATA SET

(75) Inventor: Brigitte Wirtz, Holzkirchen (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/367,022
(22) PCT Filed: Apr. 14, 1998
(86) PCT No.: PCT/DE98/01051
 § 371 Date: Aug. 6, 1999
 § 102(e) Date: Aug. 6, 1999
(87) PCT Pub. No.: WO98/50880
 PCT Pub. Date: Nov. 12, 1998

(30) Foreign Application Priority Data

May 7, 1997 (DE) .......................................... 197 19 469

(51) Int. Cl.⁷ ................................................. G06K 9/00
(52) U.S. Cl. ...................................... 382/119; 382/209
(58) Field of Search ............................... 382/119, 209, 382/217–218

(56) References Cited

U.S. PATENT DOCUMENTS

| 4,724,542 A | 2/1988 | Williford | |
| 5,052,043 A | 9/1991 | Gaborski | |
| 5,479,531 A | 12/1995 | Webster | |
| 5,559,895 A | * 9/1996 | Lee et al. | 382/119 |
| 5,680,470 A | * 10/1997 | Moussa et al. | 382/119 |
| 5,802,200 A | * 9/1998 | Wirtz | 382/119 |
| 5,930,380 A | * 7/1999 | Kashi et al. | 382/119 |

FOREIGN PATENT DOCUMENTS

| DE | 29 45 377 C2 | 5/1980 |
| DE | 195 11 470 C1 | 10/1996 |
| GB | 2 104 698 A | 3/1983 |

OTHER PUBLICATIONS

Anthony, N. J. et al, Supervised Adaptation for Signature Verification System, IBM Technical Disclosure Bulletin, vol. 21, No. 1, (1978), pp. 424–425.

T. K. Worthington, et al, IBM Dynamic Signature Verifcation, Computer Security, (1985) pp. 129–154.

* cited by examiner

Primary Examiner—Bhavesh Mehta

(57) ABSTRACT

What the method assures is that natural changes in the signature of a person are not reflected in the form of increasing rejections within the framework of an authentification of this person on the basis of the person's signature. "Natural" variation in the signature of the person is adapted to a reference signature, whereby an appropriate "distance" from a possible forged signature is adhered to so that adaptation is not undertaken in the direction of a potential forger. To that end, the signature is evaluated dependent on its distance from the reference signature and this evaluation criterion is divided into ranges that reflect the quality of the signature. Proceeding from the quality, an evaluation is possible as to whether or not an adaptation is implemented.

11 Claims, 3 Drawing Sheets

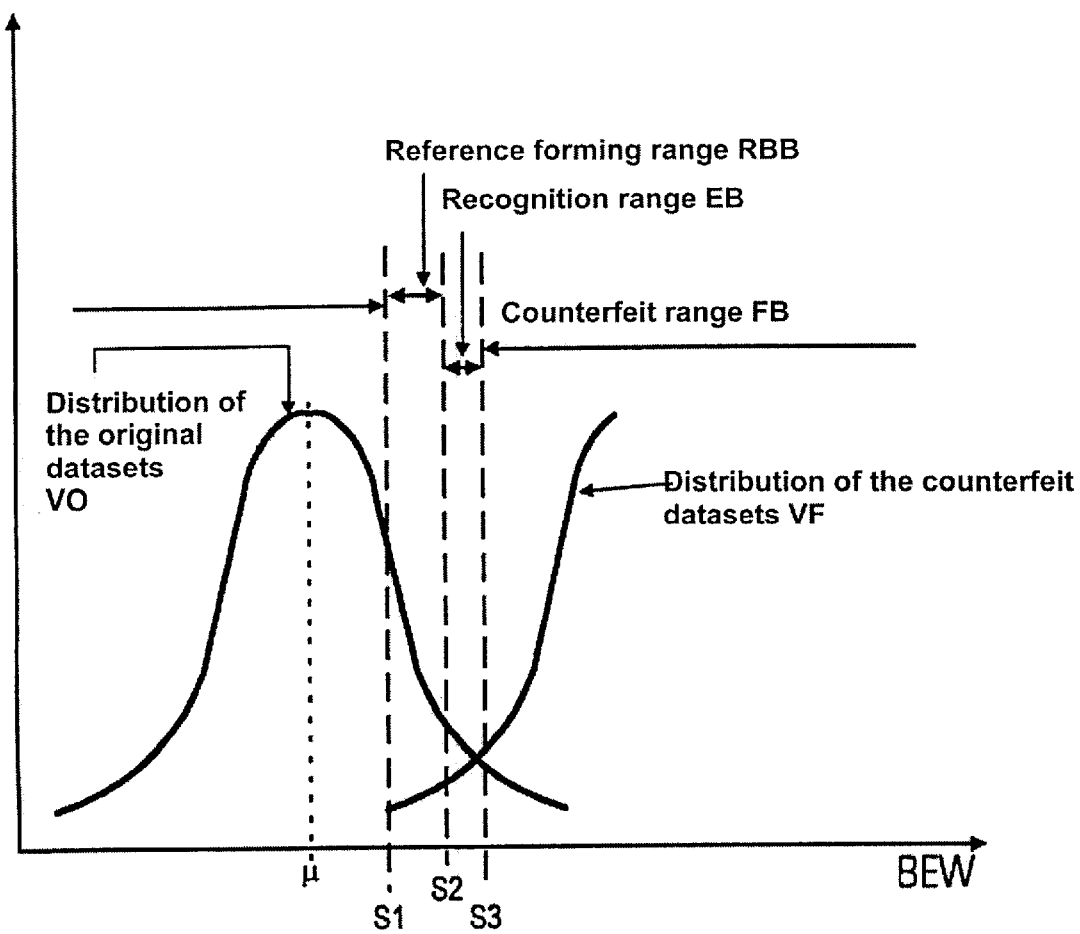

METHOD FOR COMPUTER-ADAPTATION OF A REFERENCE DATA SET ON THE BASIS OF AT LEAST ONE INPUT DATA SET

BACKGROUND OF THE INVENTION

The invention is directed to a method for the adaptation of a reference data set on the basis of at least one input data set, using a computer.

Known methods for the verification of the subscriber, for example by inputting a password or with a chip card, are based on the fact that the subscriber has knowledge (password) known only to him or that only he has the corresponding medium (chip card) for granting access.

As an alternative thereto, biometry makes use of a physiological or of a behavior-typical mannerism of the subscriber in the automatic identity verification or in general for authentification.

Physiological methods thereby make use of a human mannerism that normally does not change or changes only slightly. Corresponding features exhibit the advantages that they cannot be stolen and can only be copied with great effort.

A signature verification is a biometric method. A signature input into a computer is thereby processed independently of the textural content, with the goal of either confirming or denying the authenticity of the author.

German Patent 195 11 470.1-53 discloses that a signature be obtained in electronic form using an electromagnetic pad. Such an electronic signature comprises a plurality of characterizing quantities, for example coordinate information, pressure and speed at respectively discrete sampling times. A verification of an input data set is based on a comparison with a reference data set. In the case of a signature verification, what is involved in the reference data set is an electronic signature, referred to below as "reference signatures"; the input data set is a currently requested signature that, for example, is input with an electronic pad.

It is well known that hand-written signatures of the same person are not absolutely identical to one another. Moreover, critical features of the signature of a person can change over time.

The reference by T. K. Worthington, T. J. Chainer, J. D. Williford, S. C. Gunderen (IBM Dynamic Signature Verification, Computer Society, IFIP 1985, pages 129–154); and discloses a method for reference data adaption. However, there is a risk that a forgery can occur.

SUMMARY OF THE INVENTION

The object of the invention is comprised in automatically adapting reference data that is subject to modification over time without being subject to forgery.

The invention specifies a method for the adaption of a reference data set on the basis of at least one input data set, using a computer. To that end, an evaluation criterion that characterizes a coincidence with the one reference data set is thereby first defined for the at least one input data set. When the evaluation criterion lies within a predetermined, first range, the input data set is entered into a buffer memory and a new reference data set is determined. When the evaluation criterion lies within a predetermined, second range, then a next reference data set is determined from the data sets of the buffer memory. When the next reference data set is "better" than the "old" reference data set, then the next reference data set is employed instead of the "old" reference data set. When, by contrast, the next reference data set is "poorer" than the "old" reference data set, then the next reference data set is discarded. When the evaluation criterion lies within a third range, then the reference data set remains unmodified.

A first data set is thereby "better" than a second data set when a distance of the first data set from the reference data set defined by an evaluation criterion is shorter (i.e. coincides better with the reference data set) than the distance of the second data set from the reference data set. Analogous thereto, the second data set is then "poorer" than the first data set.

The reference data set is preferably determined in that prescribable characteristic quantities of a prescribable plurality of data sets are averaged. As known from German Patent 195 11 470.1-53, there is thereby a data set (vector) at each sampling time that contains the characteristic quantities for this sampling time. Taking all or a part of these characteristic quantities into consideration, a reference data set is determined by averaging the values.

Alternatively thereto, the reference data set can be selected from a set of original data sets, i.e. data sets wherein it is certain that they derive from the authorized subscriber, this reference data set representing the best description of the original data sets in the feature space defined by the characteristic quantities.

Without limitation, these two possibilities are merely two alternatives for reference data set determination. Many other possibilities are conceivable, these likewise being capable of being employed in the invention.

One development of the buffer memory is a ring buffer that contains a prescribable plurality of data sets. A ring buffer is characterized in that the oldest data set therein is erased as soon as a new data set is added. This, of course, applies given the condition that the ring buffer is full since the new data set is otherwise simply added.

A next development of the invention is comprised in verifying the input data set as an original data set when the evaluation criterion lies within the first range or the second range. When the evaluation criterion for the input data set lies outside the first or outside the second range, then a verification of the input data set is to be negated; the input data set is considered to be a forgery.

Another development is comprised therein that original data sets are written according to a probability distribution. Such a probability distribution can be a normal distribution with an anticipated value and with a standard deviation.

Within the framework of an additional development, further, the reference data set is determined by the anticipation value of the original data sets.

Finally, a subdivision of the individual ranges can be determined by the following notation:

| | |
|---|---|
| First range: | BEW $\in [0; \mu + \alpha_1 \sigma]$ |
| Second range: | BEW $\in [\mu + \alpha_1 \cdot \sigma; \mu + \alpha_2 \cdot \sigma]$, |
| Third range: | BEW $\in [\mu + \alpha_2 \cdot \sigma; \infty]$, | whereby

BEW indicates the evaluation criterion, $\mu$ indicates the anticipation value, $\sigma$ indicates the standard deviation, $\alpha_1$ indicates a prescribable parameter with which an upper threshold of the first range is identified;

$\alpha_2$ indicates a prescribable parameter with which an upper threshold of the second range is defined.

It is also possible to additionally subdivide the value range of the evaluation criterion into a fourth range that lies between the second and the third range and is defined with prescribable thresholds. Original data sets that are recognized as such without the reference data set being modified can lie in this range.

Within the scope of an application of the invention, the data sets can be signatures that are electronically registered and stored and that comprise a prescribable set of characteristic quantities (also see the introduction to the specification).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 is a sketch that, based on FIG. 2, shows an additional range within the evaluation space.

DESCRIPTION OF THE PREFERRED EMBODIMENTS

An exemplary embodiment that is directed to the application of "signature verification" is presented below.

Before a subscriber can be electronically verified with his signature, reference signature (reference data set) is determined from a number of signatures. This occurs on the basis of one of the aforementioned methods for reference data set determination. A reference signature is thereby determined from a plurality of provided signatures that can be documented to derive from the subscriber himself (authentic signatures).

The reference signature found at the beginning by determining reference data sets is based on the original data sets that the subscriber performed for establishing the reference data set. These original data sets (signatures) are more similar to one another than a signature that the subscriber provides at a later point in time. Further, a signature is subject to a long-term variation due to the writing behavior of the subscriber. If, for example, an authentic subscriber has changed his signature over the years, accordingly, he must count on an increasing rejection rate until, finally, the system no longer recognizes him at all as an authorized subscriber at some point in the future if an adaptation to the "natural" variation in the signature of the subscriber has not occurred as described in this invention.

As mentioned above, the solution is that a creeping change in the signature is countered by adaptation of the reference signature. A problem of forgery thereby arises, i.e. it must be assured that an adaptation is not based on the properties of a signature of a potential forger.

The invention represents a method for the adaptation of the reference signature that takes security-relevant criteria into consideration and compensates variations in the signatory behavior of the original subscriber.

Figure 1:
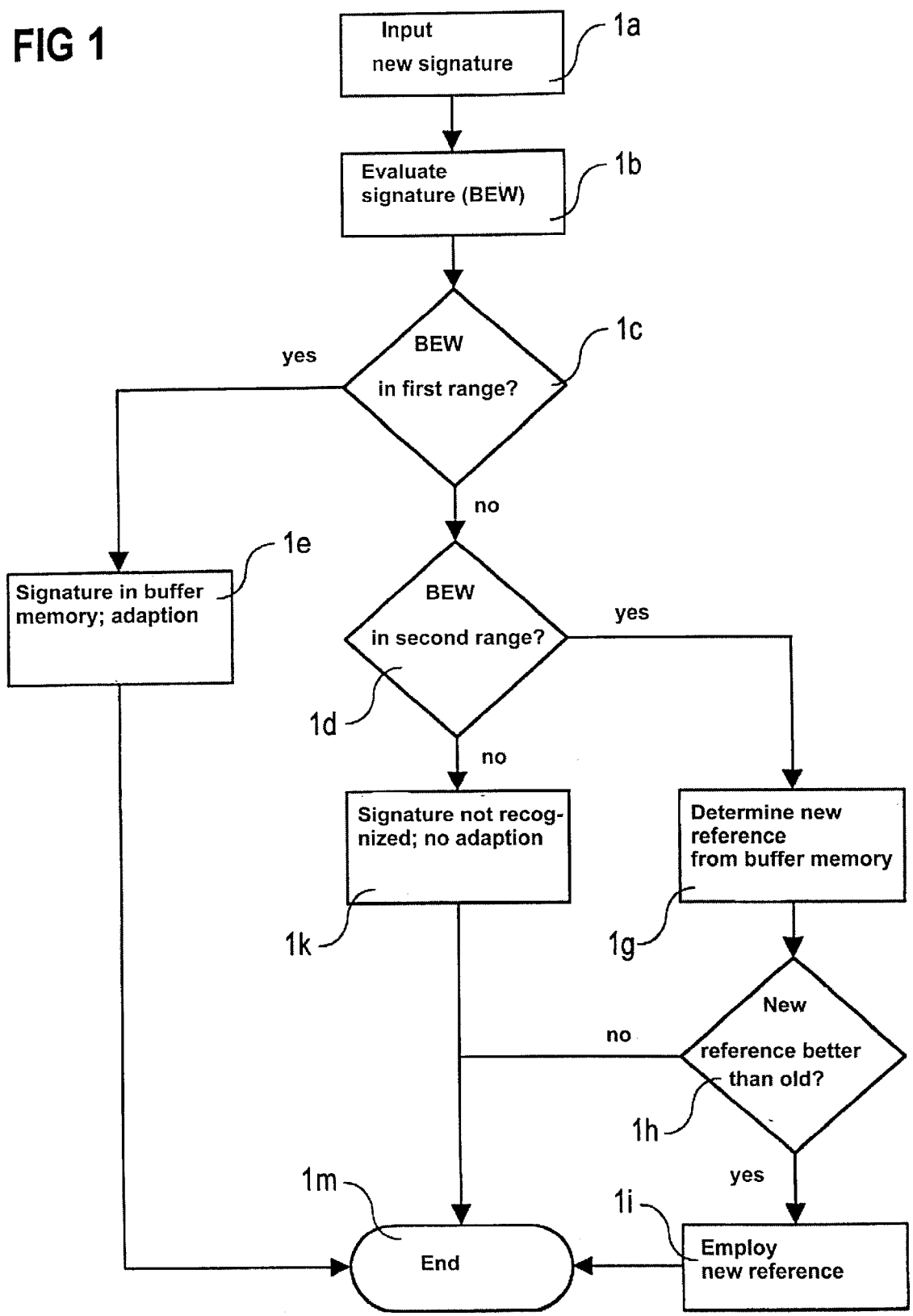
FIG. 1 is a block diagram that contains steps of a method for adaption of at least one reference data set on the basis of at least one input data set.

With reference to a block diagram, steps of the method for the adaptation of the reference signature (reference data set) are shown in FIG. 1. The assumption is that, as was presented in detail above, a reference signature was determined from a set of original data sets (reference data set determination).

In a step 1a, a new input data set is added, i.e. a signature is performed and electronically acquired. In step 1b, the electronic signature is evaluated. To this end, a distance from the reference signature is identified on the basis of a suitable method and is stored as evaluation criterion BEW. When the evaluation criterion BEW lies in a first range, referred to below as updating range, then the signature is verified and entered into a buffer memory.

The buffer memory is preferably a ring buffer, i.e. it has a prescribable of free memory locations available to it, whereby, when all memory locations in the ring buffer are occupied, the oldest data set is erased with the addition of a new data set into the ring buffer. When all memory locations of the ring buffer are not occupied, then the deletion of a data set is omitted and the new data set is merely inserted into the ring buffer.

In step 1e, the signature is entered into the buffer memory and the reference data set is adapted. What is thereby achieved is that a signature (input data set) that lies in the updating range, i.e. has a prescribable distance from a forgery, initiates an adaptation. "Good" signatures are utilized for a "natural" modification of the signature of the authorized subscriber. This adaptation of the reference signature is explained in greater detail below:

In general, a reference signature is composed of many signatures, whereby the reference signature contains a weighting corresponding to the plurality of signatures on which it is based. When a reference signature $U_{ref}$ was acquired, for example, from 10 signatures and when a further signature U is added thereto, then an adaptation to form a new reference signature $U_{ref,new}$ occurs such that the following is valid:

$$U_{ref,new} = \frac{10}{11} U_{ref} + \frac{1}{11} U \quad (1)$$

What is thereby critical is the weighting of the (old) reference signature that corresponds to the plurality (10 here) of original signatures on which it is based. When a further adaptation of the new reference signature $U_{ref,new}$ into a further reference signature $U_{ref,new'}$ is undertaken on the basis of a further original signature U', then, analogous to equation (1), the following is valid:

$$U_{ref,new'} = \frac{11}{12} U_{ref,new} + \frac{1}{12} U' \quad (2)$$

The adaptation continues in this way, whereby the weighting of the newly added signature $U_{i'}$ decreases farther and farther (compare U to U'). An alleviation is provided here by a threshold SW that assures a prescribable minimum weighting of every added signature $U_{i'}$:

$$U_{ref,i'} = \frac{SW-1}{SW} U_{ref,i} + \frac{1}{SW} U_{i'} \quad (3)$$

When the evaluation criterion lies in a second range (see step 1c), referred to in future as reference formation range, a next reference signature is formed according to the method for the reference data set determination (step 1g), whereby the data sets of the buffer memory are employed for this purpose, and this next reference data set is compared to the (old) reference data set (step 1H). When the next reference data set is better than the old reference data set, then the next reference data set is employed and the (old) reference data set is discarded (step 1i).

When the next reference data set is not better than the (old) reference data set (step 1h), then no further adaptation is undertaken. The (old) reference data set remains.

When the evaluation criterion does not lie within the reference formation range, then the signature is not verified in step 1k; of course, no adaptation of a reference data set whatsoever occurs, either. In this case, the subscriber is not verified, whether he made a poor signature or whether it is a matter of forgery.

For the sake of completeness, a final condition is recited in FIG. 1 that indicates that the illustrated method terminates there. In various branches in the block diagram of FIG. 1 all end in this final condition 1m.

Figure 2:
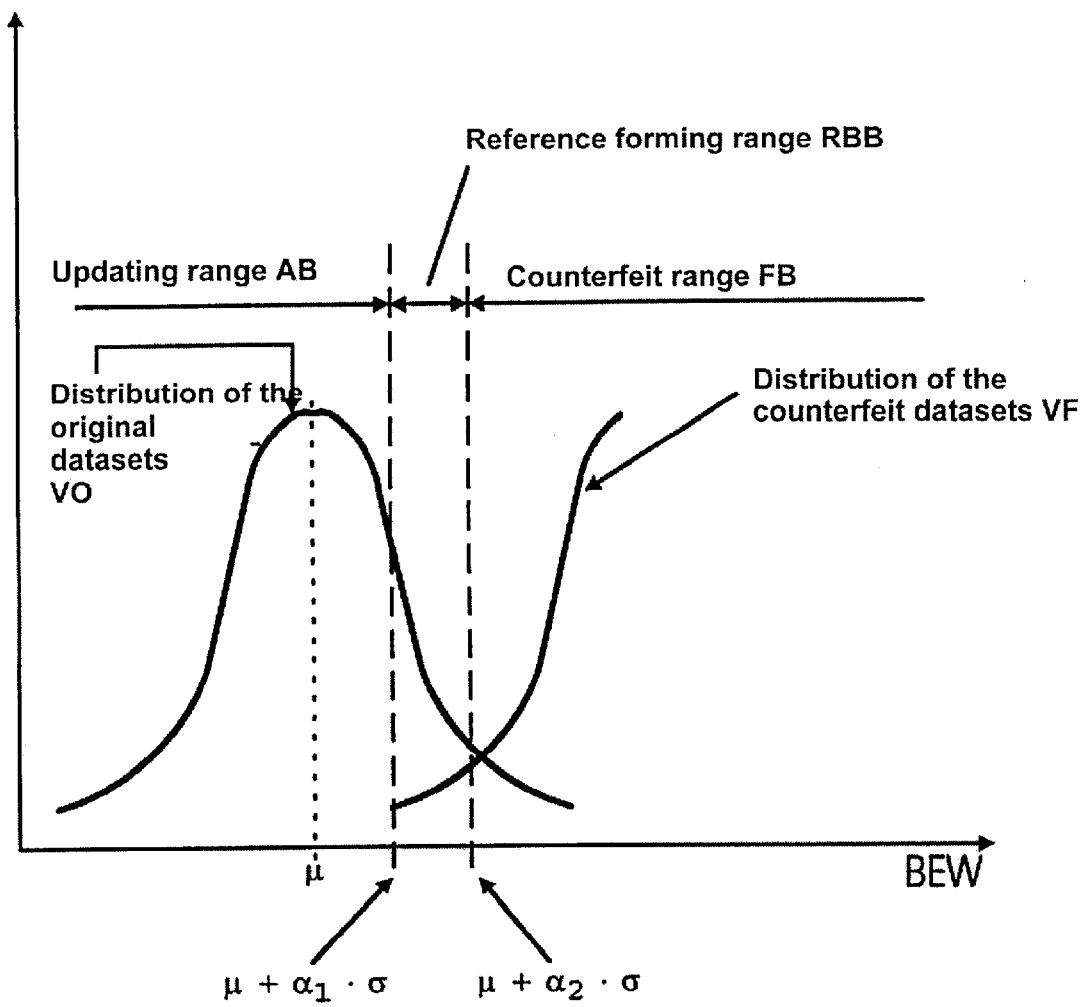
FIG. 2 is a sketch that shows various ranges in an evaluation space for verification of a signature.

A plurality of signatures AU are entered on the ordinate and the evaluation criterion BEW is entered on the abscissa in a two-dimensional diagram in FIG. 2. The original data sets are assumed to be according to a probability distribution (normal distribution).

The distribution of the original data sets is determined by the anticipation value $\mu$. The above-described, three ranges are illustrated here, whereby the following is valid:

| | |
|---|---|
| First range = | updating range AB with BEW $\in [0; \mu + \alpha_1 \sigma]$, |
| Second range = | reference forming range RBB With BEW $\in [\mu + \alpha_1 \cdot \sigma; \mu + \alpha_2 \cdot \sigma]$, |
| third range = | forgery range FB With BEW $\in [\mu + \alpha_2 \cdot \sigma; \ldots ]$. |

Input data line in the updating range AB lead to an adaptation (renewed determination of reference data set), whereas a check is first carried out given input data from the reference forming range as to whether adaptation is thereby carried out in the "correct" direction, i.e. toward the original data sets and not toward forgeries before a determination of a reference data is initiated.

The updating range AB serves for intercepting slow variation in the signature of an authorized subscriber, whereas greater fluctuations (modifications) in the signature are taken into consideration into the reference forming range RBB. Since the buffer memory only contains signatures from the updating range, an adaptation toward forgers is clearly more difficult.

The prescribable parameters $\alpha_1$ and $\alpha_2$ are established such that, first, no forgeries proceed into the ongoing adaptation (dependent on $\alpha_1$) and, second, the constant error rate between originals and forgeries becomes as small as possible (dependent on $\alpha_2$).

A fourth range (recognition range EB) is shown in FIG. 3 in addition to FIG. 2 and the designations introduced therein. Given signatures whose evaluation criterion lies in this range, it is still a matter of original signatures but no reference formation is evaluated (as in the reference forming range RPB) and an adaptation is also not undertaken (as in the updating range AB). The signature is verified; the existing reference signature experiences no modification.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for computer-adaptation of a reference data set based on at least one input data set, comprising the steps of:
   a) determining an evaluation criterion in view of a coincidence with the at least one reference data set for the input data set;
   b) entering the input data set into a buffer memory and determining a new reference data set when the evaluation criterion lies within a predetermined, first range;
   c) determining a next reference data set from the data sets from the buffer memory when the evaluation criterion lies within a predetermined, second range, and when a next reference data set is better than a previous reference data set, using the next reference data set and discarding the old reference data set, otherwise, when the next reference data set is poorer than the previous reference data set, discarding the next reference data set;
   d) otherwise, not modifying the reference data set.

2. The method according to claim 1, wherein the reference data set is determined in that prescribable characteristic quantities of a prescribable plurality of data sets are averaged.

3. The method according to claim 1, wherein a data set is selected as reference data set from a prescribable plurality of data sets whose characteristic quantities best describe the selected data sets.

4. The method according to claim 1, wherein the buffer memory is a ring buffer having a prescribable plurality of data sets.

5. The method according to claim 1, wherein the input data set is an original data set when the evaluation criterion lies within the first range or second range or the input data set is a forgery when the evaluation criterion lies outside the first range or second range.

6. The method according to claim 1, wherein original data sets are distributed according to a probability distribution.

7. The method according to claim 6, wherein the probability distribution is a normal distribution with an anticipation value and a standard deviation.

8. The method according to claim 7, wherein the reference data set corresponds to the anticipation value of the original data sets.

9. The method according to claim 7, wherein the first range is determined by an interval $$BEW \in (0; \mu+\alpha_1 \sigma),$$

where

BEW denotes the evaluation criterion, $\mu$ denotes the anticipation value, $\sigma$ denotes the standard deviation, $\alpha_1$ denotes a prescribable parameter with which an upper threshold of the first range is defined, and wherein the second range is determined by an interval $$BEW \in (\mu+\alpha_1 \cdot \sigma; \mu+\alpha_2 \cdot \sigma),$$

where $\alpha_2$ references a prescribable parameter with which an upper threshold of the second range is defined, and wherein a third range is defined by an interval $$BEW \in (\mu + \alpha_2 \cdot \sigma; \infty),$$

whereby the third range covers forgeries.

10. The method according to claim 9, wherein the input data set that lies in a fourth range between the second range and the third range with prescribable thresholds is recognized as original data set but the reference data set is not modified.

11. The method according to claim 1, wherein the data sets are signatures that are electronically registered and stored and that cover a prescribable set of characteristic quantities.

* * * * *